United States Patent
Redaelli

(10) Patent No.: US 12,547,325 B2
(45) Date of Patent: Feb. 10, 2026

(54) AUTHENTICATION-BASED AND HARDWARE-BASED LOCKDOWN FEATURES FOR A MEMORY SYSTEM

(71) Applicant: Micron Technology, Inc., Boise, ID (US)

(72) Inventor: Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/783,844

(22) Filed: Jul. 25, 2024

(65) Prior Publication Data

US 2026/0029933 A1    Jan. 29, 2026

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 2019/0065113 A1* | 2/2019 | Kim | G06F 3/0679 |
| 2022/0107737 A1* | 4/2022 | Choi | G06F 3/0622 |
| 2022/0171833 A1* | 6/2022 | Shachar | G06F 21/30 |
| 2022/0198072 A1* | 6/2022 | Strong | G06F 21/755 |
| 2023/0131062 A1* | 4/2023 | Kim | G06F 3/0679 |
| | | | 711/103 |

* cited by examiner

*Primary Examiner* — Edward J Dudek, Jr.
*Assistant Examiner* — Ralph A Verderamo, III
(74) *Attorney, Agent, or Firm* — Harrity & Harrity, LLP

(57) ABSTRACT

In some implementations, a memory system may receive a lockdown command associated with one or more operations of the memory system, wherein the lockdown command indicates, for each operation: whether the operation is to be locked down using an authentication-based lockdown feature, and whether the operation is to be locked down using a hardware-based lockdown feature. The memory system may perform at least one of: storing a first lockdown configuration associated with a first operation in an authentication-key-protected portion of the memory system when the lockdown command indicates that the first operation is to be locked down using the authentication-based lockdown feature; or storing a second lockdown configuration associated with a second operation in a hardware-pin-protected portion of the memory system when the lockdown command indicates that the second operation is to be locked down using the hardware-based lockdown feature.

20 Claims, 6 Drawing Sheets

AUTHENTICATION-BASED AND HARDWARE-BASED LOCKDOWN FEATURES FOR A MEMORY SYSTEM

TECHNICAL FIELD

The present disclosure generally relates to memory devices, memory device operations, and, for example, to authentication-based and hardware-based lockdown features for a memory system.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source. In some examples, a memory device may be associated with a solid state drive (SSD), such as a multi-port SSD, among other examples.

DETAILED DESCRIPTION

Figure 1:
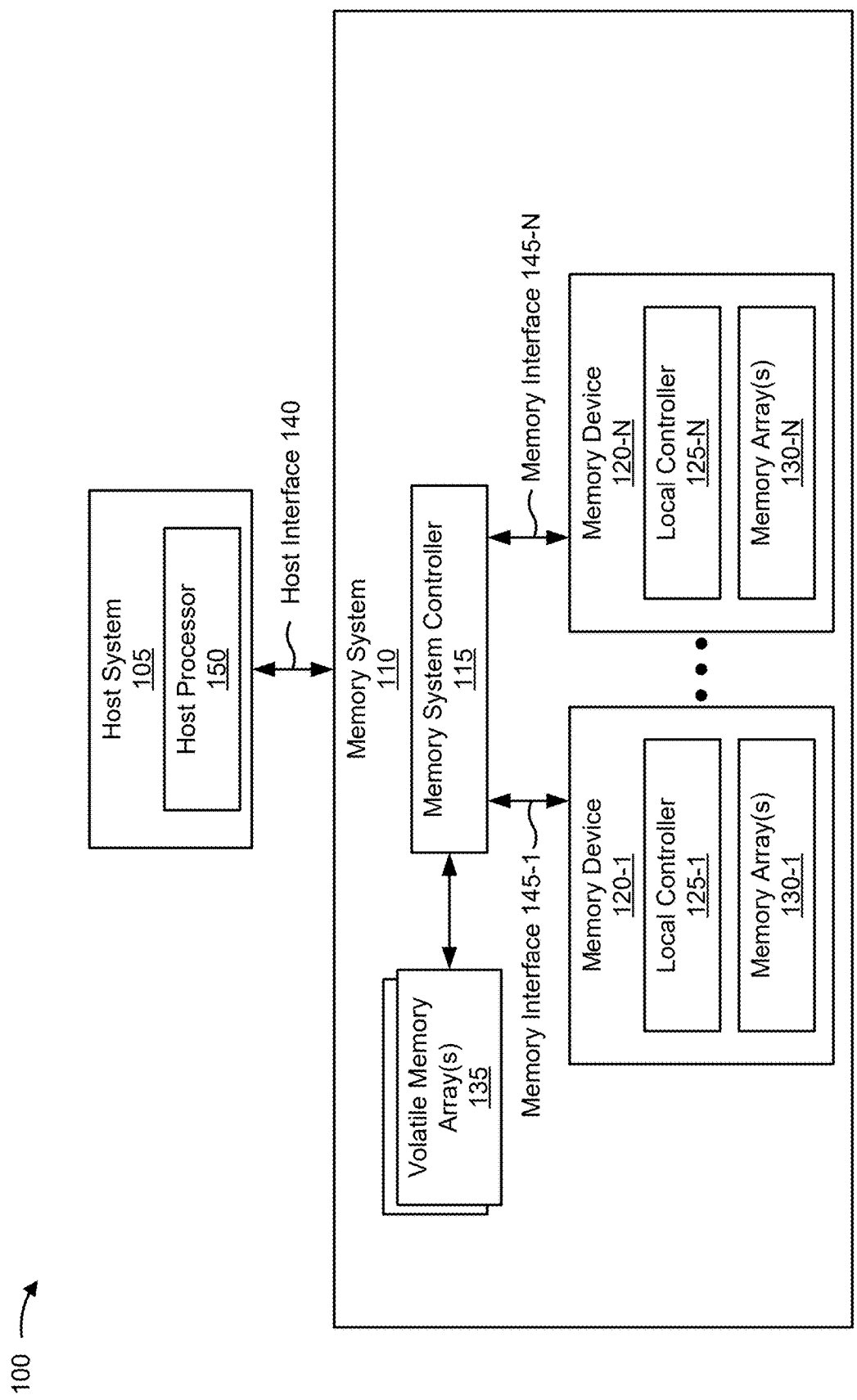
FIG. 1 is a diagram illustrating an example system capable of implementing authentication-based and hardware-based lockdown features.

Certain applications and/or industries may use multi-port memory systems, such as multi-port SSDs. For example, in the automotive industry, multi-port SSDs may allow for simultaneous interfacing with different automotive systems, such as in-vehicle infotainment (IVI) systems using one port and/or advanced driver-assistance systems (ADAS) using another port. In such applications, sharing of resources between systems of varying security levels may pose a security risk. For example, lower-security systems, such as IVI systems, may be more susceptible to external interactions that could compromise critical functions like ADAS, or the like. More particularly, cyber-attacks originating from the IVI port may disrupt the ADAS, particularly in applications in which the IVI systems and the ADAS share resources, leaving the multi-port SSD vulnerable to threats such as denial of service (DOS) attacks originating at an IVI port that may hinder safety-critical systems. For example, common components within a multi-port SSD, such as firmware, may be a vector for security breaches by permitting access to high-security systems (e.g., ADAS) via lower-security interfaces (e.g., IVI ports).

Existing measures for securing multi-port SSDs may have drawbacks in that they are unable to provide persistent protection and resilience against sophisticated cyber-attacks. For example, some DOS attacks may be associated with instructing a memory system (e.g., an SSD) to run certain commands (e.g., non-volatile memory express (NVMe) commands) at inopportune times in an effort to disrupt and/or halt regular memory system operation. More particularly, instructing an SSD to perform a firmware download command, an NVMe format command, a self-test command, a sanitize command, and/or a similar command at an inopportune time may disrupt normal operations of the SSD.

In an effort to thwart such attacks, a memory system may be capable of receiving a lockdown command (e.g., an NVMe lockdown command), such as via a management port associated with the memory system. A management port may be a dedicated port for secure configuration of the memory system (e.g., SSD), such as a port permitting security configuration (e.g., passwords, command restrictions, and/or lockdown rules), a port associated with performance optimization procedures (e.g., quality of service (QOS) management across ports, among other examples), a port associated with health monitoring of the memory system (e.g., overall and/or individual port health monitoring, among other examples), a port associated with firmware download procedures, and/or a port associated with similar operations.

A lockdown command, as one example command that may be transmitted to a memory system via a management port, is a security feature that enables granular control over memory systems attached to an operating system (OS) (e.g., a host system), such as via a peripheral component interconnect express (PCIe) bus. In such examples, a host system may send, to a memory system (e.g., an SSD), the lockdown command with arguments, with each argument including a prohibit bit indicating whether a specific command and/or feature associated with the memory system is to be allowed (e.g., when the prohibit bit is not set) or prohibited (e.g., when the prohibit bit is set), as well as a command operation code ("opcode") and/or a feature identifier (ID) indicating the specific command and/or feature associated with the prohibit bit. The memory system controller (e.g., an NVMe controller) may receive the lockdown command and/or may apply the corresponding lockdown rules for each command and/or feature identified by the lockdown command.

For example, if the memory system controller receives a prohibited command (e.g., a locked down command), the memory system controller may assert a failure status, and if the memory system controller receives an allowed command, the memory system controller may function normally (e.g., the memory system controller may execute the command). In some examples, the lockdown states for each command and/or feature may be reset upon a power cycle of the memory system (e.g., lockdown configurations associated with the commands and/or features indicated by the lockdown command may not be persistent across power cycles of the memory system). In some examples, the lockdown command is associated with a software-based lockdown mechanism (such as a software lockdown mechanism defined by the NVMe standardization body), and thus procedures associated with a lockdown command are sometimes referred to herein as a software-based lockdown feature (or simply "SW-lockdown," for ease of description).

In such examples, the lockdown command (e.g., a lockdown command associated with a SW-lockdown mechanism, such as an NVMe lockdown command) may thwart certain DOS attacks, because disruptive commands (e.g., a firmware download command, an NVMe format command, a self-test command, a sanitize command, and/or similar commands) may be locked down and thus the memory system controller may refrain from executing the commands if received during regular memory system operation. However, security provided by the software-based lockdown feature may be limited, because the lockdown configurations may be altered via the management port, and thus the security of the lockdown feature may be dependent on the management port being secure. Moreover, because the lockdown configurations may be reset by power cycling the memory system, the memory system may be vulnerable to attacks following a power cycle and/or that first force a power cycle and then issue disruptive commands that would otherwise be prohibited by the software-based lockdown feature.

Some implementations described herein enable improved lockdown features for a memory system (e.g., a multi-port SSD or a similar memory system), such as lockdown features that are not vulnerable to attacks made via an insecure management port and/or are not vulnerable to attacks associated with power cycling the memory system. In some implementations, a memory system may receive (e.g., from an OS and/or a host system) a lockdown command that indicates, for each of the one or more operations associated with the memory system, whether the operation is to be locked down using an authentication-based lockdown feature and/or whether the operation is to be locked down using a hardware-based lockdown feature. In implementations in which an operation is to be locked down using the authentication-based lockdown feature, the memory system may store a lockdown configuration associated with the operation in an authentication-key-protected portion of the memory system, such that the operation can only be unlocked using a secure password (e.g., an authentication key) and/or such that the lockdown configuration persists across power cycles of the memory system. Similarly, in implementations in which an operation is associated with the hardware-based lockdown feature, the memory system may store a lockdown configuration associated with the operation in a hardware-pin-protected portion of the memory system, such that the lockdown configuration can only be unlocked by engaging (e.g., pressing) a hardware pin during a system reboot and/or such that the lockdown configuration persists across power cycles of the memory system. As a result, the improved lockdown features may enable more secure memory devices, such as more secure multi-port SSDs, and/or may reduce memory system errors and/or failures associated with DOS attacks or similar breaches, thereby reducing power, computing, and storage resource consumption otherwise required for correcting memory system errors.

FIG. 1 is a diagram illustrating an example system 100 capable of implementing authentication-based and hardware-based lockdown features. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, an SSD, a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), a compute express link (CXL) memory module, and/or a random-access memory (RAM) device, such as a dynamic RAM (DRAM) device or a static RAM (SRAM) device. In some examples, the memory system 110 may be a multi-port memory system, such as a multi-port SSD or a similar multi-port system.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, a CXL controller (e.g., a CXL ASIC) connected to DRAM, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, a DIMM interface, and/or a CXL interface (e.g., a PCIe/CXL interface).

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to receive, from a host system, a lockdown command associated with one or more operations of a memory system, wherein the lockdown command indicates, for each of the one or more operations: whether the operation is to be locked down using an authentication-based lockdown feature, and whether the operation is to be locked down using a hardware-based lockdown feature; and perform at least one of: store a first lockdown configuration associated with a first operation, of the one or more operations, in an authentication-key-protected portion of the memory system when the lockdown command indicates that the first operation is to be locked down using the authentication-based lockdown feature; or store a second lockdown configuration associated with a second operation, of the one or more operations, in a hardware-pin-protected portion of the memory system when the lockdown command indicates that the second operation is to be locked down using the hardware-based lockdown feature.

In some implementations, one or more systems, devices, apparatuses, components, and/or controllers of FIG. 1 may be configured to receive, from a host system, an NVMe lockdown command that indicates one or more arguments, wherein each argument, of the one or more arguments, is associated with a memory operation, of one or more memory operations associated with a multi-port SSD, and wherein each argument, of the one or more arguments, indicates: whether the memory operation for the argument is to be locked down using an authentication-based lockdown feature, and whether the memory operation for the argument is to be locked down using a hardware-based lockdown feature; and perform at least one of: store a first lockdown configuration associated with a first memory operation, of the one or more memory operations, in an authentication-key-protected portion of the multi-port SSD when the NVMe lockdown command indicates that the first memory operation is to be locked down using the authentication-based lockdown feature; or store a second lockdown configuration associated with a second memory operation, of the one or more memory operations, in a hardware-pin-protected portion of the multi-port SSD when the NVMe lockdown command indicates that the second memory operation is to be locked down using the hardware-based lockdown feature.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

FIGS. 2A-2D are diagrams of an example 200 associated with authentication-based and hardware-based lockdown features for a memory system. The operations described in connection with FIG. 2A-2D may be performed by the memory system 110 and/or one or more components of the memory system 110, such as the memory system controller 115, one or more memory devices 120, and/or one or more local controllers 125.

Figure 2A:
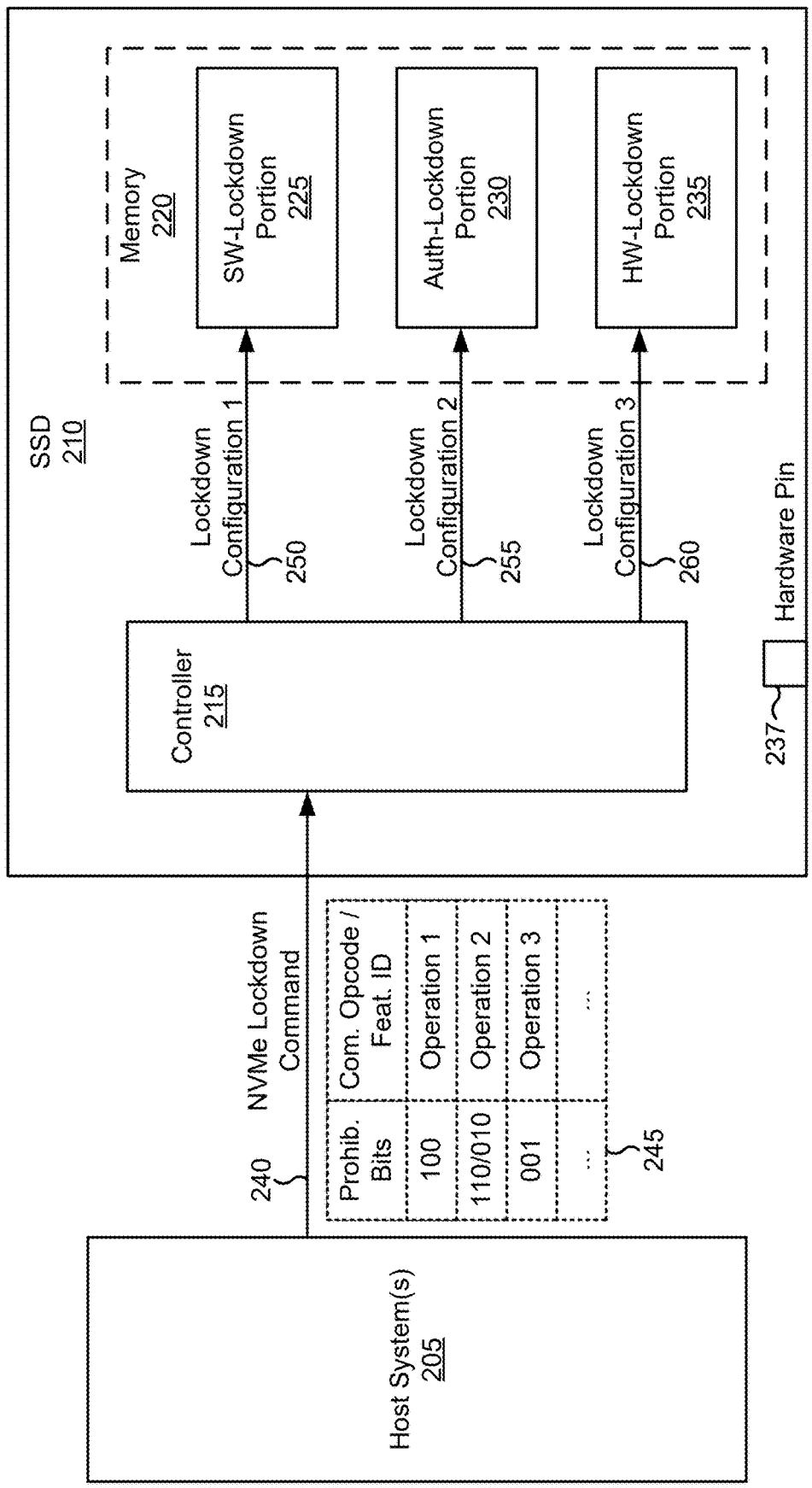
FIGS. 2A-2D are diagrams of an example associated with authentication-based and hardware-based lockdown features for a memory system.

As shown in FIG. 2A, and as described in more detail below, in some implementations the example 200 may be associated with one or more host systems 205 (e.g., one or more host systems 105) that are in communication with an SSD 210 (e.g., a multi-port SSD and/or memory system 110), such as via one or more interfaces (e.g., one or more host interfaces 140, such as an NVMe interface, among other examples). A multi-port SSD is an SSD that supports multiple ports, allowing the SSD to connect to and/or be accessed by multiple host systems, processors, and/or system on chips (SoCs) simultaneously. A multi-port SSD may be useful in environments where multiple systems need to access the same storage resources, such as in advanced automotive systems associated with a centralized storage architecture.

Although for ease of description the example 200 is described in connection with the SSD 210 (e.g., a multi-port SSD) and/or NVMe protocols, in some other implementations, the example 200 may be associated with a different type of memory system (e.g., a memory system other than an SSD and/or a multi-port SSD) and/or may be associated with a different type of host interface and/or communication protocol (e.g., an interface other than an NVMe interface and/or a communication protocol other than an NVMe protocol).

As further shown in FIG. 2A, the SSD 210 may include a controller 215 (e.g., an NVMe controller and/or a memory system controller 115) and/or a memory 220 (e.g., one or more memory devices 120 and/or one or more memory arrays 130 associated with one or more memory devices, such as NAND flash memory and/or a NAND device, among other examples). The memory 220 may be associated with a portion of the memory 220 used to store lockdown configurations associated with a software-based lockdown feature (e.g., SW-lockdown), shown as SW-lockdown portion 225; a portion of the memory 220 used to store lockdown configurations associated with an authentication-based lockdown feature (sometimes referred to herein as auth-lockdown), shown as auth-lockdown portion 230; and/or a portion of the portion of the memory 220 used to store lockdown configurations associated with a hardware-based lockdown feature (sometimes referred to herein as "HW-lockdown"), shown as HW-lockdown portion 235.

The software-based lockdown feature may refer to a conventional lockdown feature (e.g., the NVMe lockdown feature described above), in which the SSD 210 may store lockdown configurations for certain commands and/or features of the SSD 210 (sometimes collectively referred to herein as "operations" of the SSD 210 for ease of description). In some implementations, lockdown configurations associated with the software-based lockdown feature may be reset by power cycling the SSD 210, in a similar manner as described above.

The authentication-based lockdown feature may refer to a lockdown feature that uses an authentication-based approach (e.g., a password-protected approach and/or an authentication-key-based approach) for setting lockdown configurations at the SSD 210. In some implementations, the authentication-based approach may leverage replay protected memory block (RPMB) authentication (e.g., the auth-lockdown portion 230 may be an RPMB) for lockdown operations, and/or may otherwise be associated with the SSD 210 storing a lockdown context (e.g., information associated with locked-down NVMe commands) in a secure, tamper-resistant portion of the SSD 210 (e.g., the auth-lockdown portion 230). In some implementations, the SSD 210 may require a password (e.g., an RPMB password and/or a similar authentication key) to modify the lockdown state, ensuring authorized access to the lockdown information. Put another way, in some implementations, only authorized users with the password (e.g., the RPMB password) can change the lockdown configuration. Additionally, or alternatively, the authentication-based lockdown feature may be persistent across power cycles (e.g., the lockdown configurations stored in the auth-lockdown portion 230 may not be reset by power cycling the SSD 210).

The hardware-based lockdown feature may refer to a lockdown feature that uses a hardware-pin-based approach for changing lockdown configurations at the SSD 210. For example, in some implementations, the SSD may be associated with a hardware pin 237, which, in some examples, may be associated with a "reset" hole in a casing associated with the SSD 210 and/or a similar hardware pin. In such implementations, as user that is physically present at the SSD 210 may be capable of engaging (e.g., pressing) the hardware pin 237, such as by using a small tool (e.g., a paperclip, a small screwdriver, and/or a similar tool) to press a button inside the reset hole. In such implementations, the hardware pin 237 (sometimes referred to herein as "HWL-pin") may serve as a physical lockdown switch. In that regard, the hardware-based lockdown feature may prevent any changes to the lockdown context during the current power cycle of the SSD 210. In some implementations, disabling hardware-based lockdown feature may require a system reboot, such as by engaging (e.g., pressing) the hardware pin 237 while rebooting the SSD 210. In such implementations, the hardware-based lockdown feature may provide a strong, tamper-evident security layer, because once hardware lockdown is activated, the lockdown context becomes unalterable until the next system reboot under the condition that the hardware pin 237 is engaged.

Aspects of the authentication-based lockdown feature and the hardware-based lockdown feature may be better understood in connection with the example operations shown in connection with reference numbers 240-292 in FIGS. 2A-2D.

First, as shown in FIG. 2A, and as indicated by reference number 240, a host system 205 may send an NVMe lockdown command with lockdown information to the SSD 210. The lockdown information may indicate one or more lockdown arguments. Moreover, each argument may specify one or more prohibit bits (with each prohibit bit being associated with a corresponding lockdown feature), and an ID (e.g., a command opcode and/or a feature identifier) of a specific operation (e.g., command and/or feature) associated with the one or more prohibit bits. For example, the lockdown information may include, for each indicated command opcode and/or feature ID, a first prohibit bit (sometimes referred to herein as "PRHBT-SW") associated with a software-based lockdown feature (e.g., SW-lockdown), which may be a bit that indicates whether the execution of a specific command or feature is prohibited or allowed according to the software-based lockdown feature; a second prohibit bit (sometimes referred to herein as "PRHBT-auth") associated with an authentication-based lockdown feature (e.g., auth-lockdown), which may be a bit that indicates whether the execution of a specific command or feature is prohibited or allowed according to the authentication-based lockdown feature; and/or a third prohibit bit (sometimes referred to herein as "PRHBT-HW") associated with a hardware-based lockdown feature (e.g., HW-lockdown), which may be a bit that indicates whether the execution of a specific command or feature is prohibited or allowed according to the hardware-based lockdown feature. In such implementations, a prohibit bit may be set to one of "0" or "1" to indicate that the specific memory operation is allowed, and the prohibit bit may be set to the other one of "0" or "1" to indicate that the specific memory operation is prohibited (e.g., locked down).

More particularly, as indicated by reference number 245, a lockdown command (e.g., an NVMe lockdown command) may include multiple arguments, each associated with a corresponding memory operation (indexed as "operation 1" through "operation 3" in the example 200). In some implementations, the specific memory operation for each argument may be indicated using a command opcode and/or a feature ID, among other examples. In this example, each argument may include three prohibit bits (e.g., a three-bit bit string), and/or each bit may be set to "0" to indicate that the corresponding memory operation is allowed per a corresponding lockdown feature or "1" to indicate that the corresponding memory operation is prohibited (e.g., locked down) per the corresponding lockdown feature. For example, the first bit of the three prohibit bits may correspond to a software-based lockdown feature (e.g., an NVMe lockdown feature), the second bit of the three prohibit bits may correspond to an authentication-based lockdown feature, and/or the third bit of the three prohibit bits may correspond to a hardware-based lockdown feature.

In that regard, for the example shown in FIG. 2A, the lockdown information may indicate, using bit string 100," that the first operation (e.g., operation 1) is prohibited according to the software-based lockdown feature, and thus can be reset and/or changed via a power cycle of the SSD 210. Moreover, the lockdown information may indicate, using bit string "110" (or, in some implementations, simply "010"), that the second operation (e.g., operation 2) is prohibited according to the authentication-based lockdown feature, and thus can be reset and/or changed only if a correct password (e.g., an RPMB password) is provided with the request. Additionally, the lockdown information may indicate, using bit string "001," that the third operation (e.g., operation 3) is prohibited according to the hardware-based lockdown feature, and thus can be reset and/or changed only if a hardware pin (e.g., hardware pin 237) is engaged during an SSD 210 reboot.

As indicated by reference numbers 250, 255, and 260, the SSD 210 (more particularly the controller 215 of the SSD 210) may store lockdown configurations for each operation in a corresponding portion of the memory 220. For example, for an operation that is prohibited and/or locked down only according to a software-based lockdown feature, such as operation 1 in the example shown in FIG. 2A, the controller 215 may store a corresponding lockdown configuration (sometimes referred to herein as a "lockdown context") in the SW-lockdown portion 225 of the memory 220, as indicated by reference number 250. Similarly, for an operation that is prohibited and/or locked down according to an authentication-based lockdown feature, such as operation 2 in the example shown in FIG. 2A, the controller 215 may store a corresponding lockdown configuration in the auth-lockdown portion 230 of the memory 220, as indicated by reference number 255. Moreover, for an operation that is prohibited and/or locked down according to a hardware-based lockdown feature, such as operation 3 in the example shown in FIG. 2A, the controller 215 may store a corresponding lockdown configuration in the HW-lockdown portion 235 of the memory 220, as indicated by reference number 260. In that regard, when the controller 215 receives a request from a host system 205, the controller 215 may retrieve the lockdown configurations stored in the SW-lockdown portion 225, the auth-lockdown portion 230, and/or the HW-lockdown portion 235 to determine whether the request is permitted or prohibited.

Figure 2B:
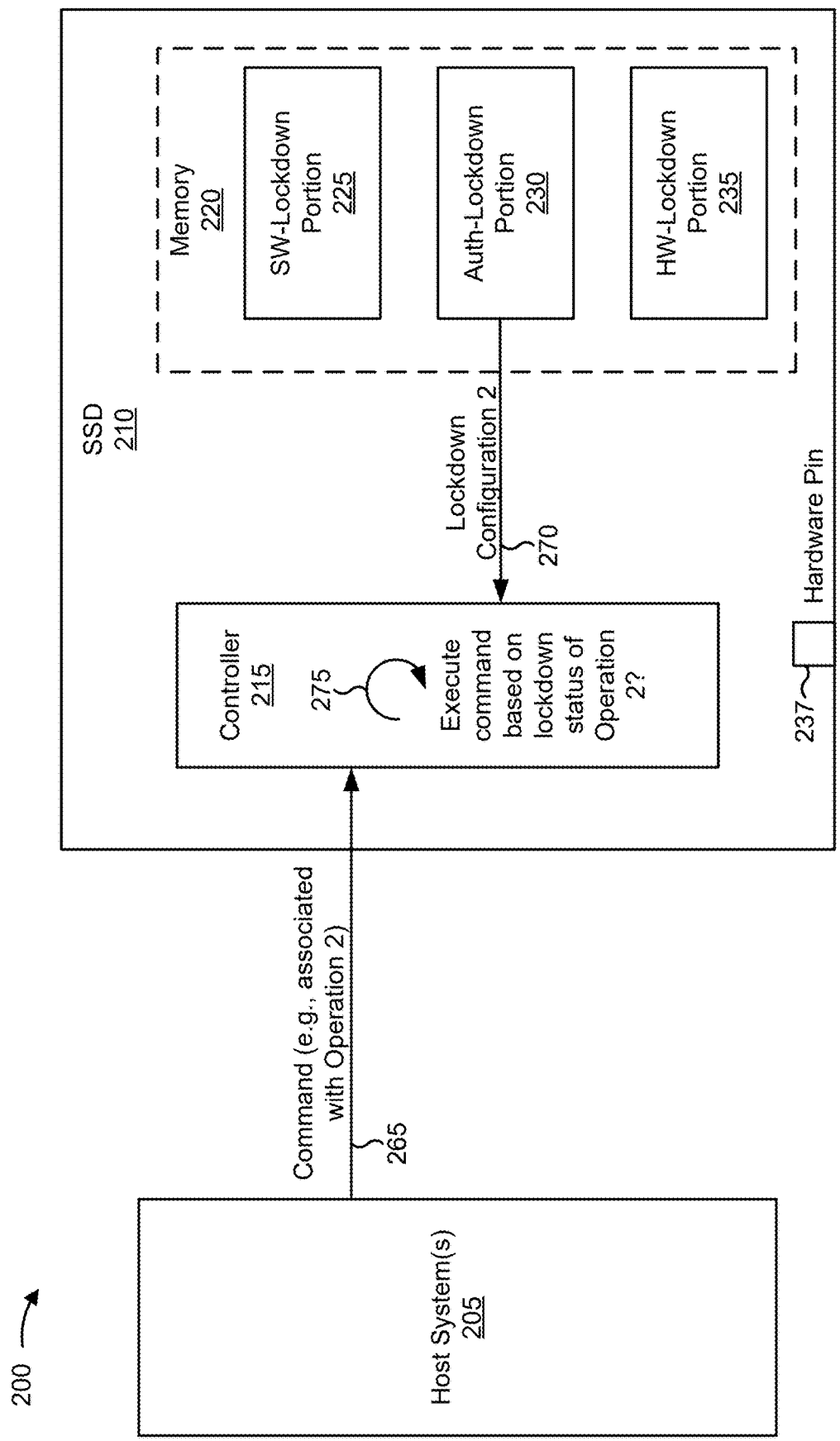

More particularly, as shown in FIG. 2B, and as indicated by reference number 265, a host system 205 may thereafter issue a command to the SSD 210, such as a command associated with a second memory operation (e.g., operation 2). In response, the SSD 210 (e.g., the controller 215 of the SSD 210) may reference the SW-lockdown portion 225 of the memory 220, the auth-lockdown portion 230 of the memory 220, and/or the HW-lockdown portion 235 of the memory 220 to determine if the memory operation is permitted or prohibited (e.g., locked down). For example, in implementations in which the command is associated with operation 2 (e.g., an operation associated with the authentication-based lockdown feature, as described above in connection with FIG. 2A), the controller 215 may retrieve the lockdown configuration associated with operation 2 (shown in FIG. 2B as "lockdown configuration 2"), as indicated by reference number 270. Moreover, as indicated by reference number 275, the controller 215 may determine whether to execute the command based on the lockdown status of the operation (e.g., based on lockdown configuration 2). For example, in examples in which operation 2 is locked down according to the authentication-based lockdown feature, which may be indicated by the lockdown configuration 2 retrieved from the auth-lockdown portion 230 of the memory 220, the controller 215 may determine that the command is not to be executed, and thus may return a failure status to the host system 205.

Figure 2C:
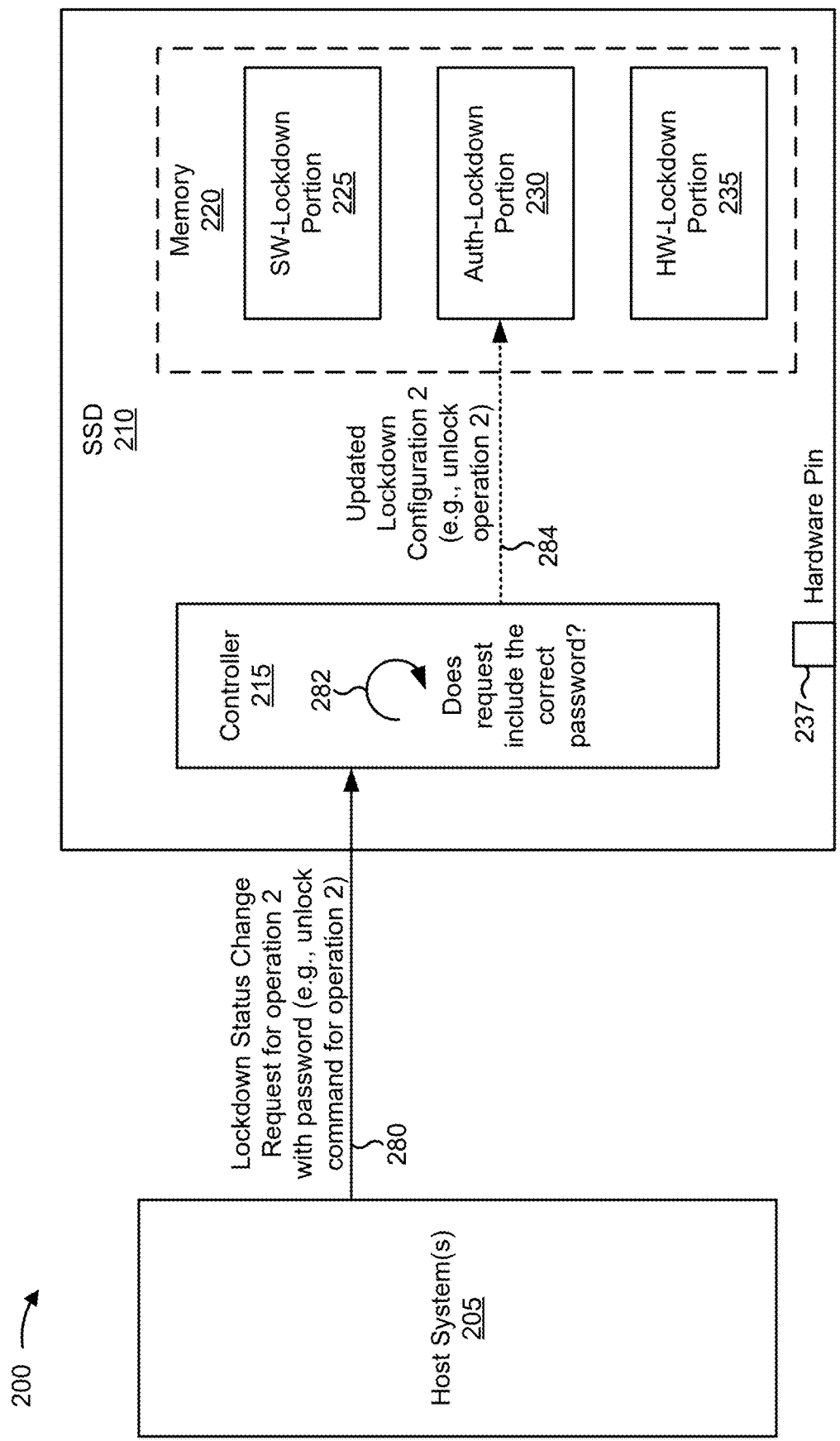

In some implementations, a lockdown status (e.g., a lockdown configuration) for a given memory operation may be changed by supplying a password (e.g., a RPMB password) for an operation associated with the authentication-based lockdown feature and/or by engaging (e.g., pressing) a hardware pin (e.g., hardware pin 237) for an operation associated with the hardware-based lockdown feature. For example, as shown in FIG. 2C, and as indicated by reference number 280, a host system 205 may send a lockdown status change request for a certain operation, such as operation 2. In some implementations, the lockdown status change request may indicate that a certain operation that was previously prohibited and/or locked down is now permitted (sometimes referred to herein as being "unlocked," and thus the lockdown status change request is sometimes referred to herein as an "unlock command"). In such implementations, if the operation associated with the lockdown status change is one that is associated with the authentication-based lockdown feature, such as operation 2 in example 200, then the lockdown status change request may further include an authentication password (e.g., an RPMB password), as further indicated by reference number 280.

As indicated by reference number 282, the SSD 210 (e.g., the controller 215 of the SSD 210) may determine whether the lockdown status change password is a correct password. For example, the controller 215 may employ various cryptographic and/or encryption techniques to validate the password and thus the lockdown status change request. In implementations in which the password is validated, an updated lockdown configuration (shown in FIG. 2C as "updated lockdown configuration 2") may be stored in the memory 220, such as in the auth-lockdown portion 230 of the memory 220, as indicated by reference number 284. In some implementations the updated lockdown configuration may indicate that the corresponding operation has been unlocked, and thus subsequently received commands associated with the operation may be executed by the SSD 210. However, in implementations in which the password is not validated, the controller 215 may reject the lockdown status change request, such as by returning a failure status to the host system 205, among other examples.

Figure 2D:
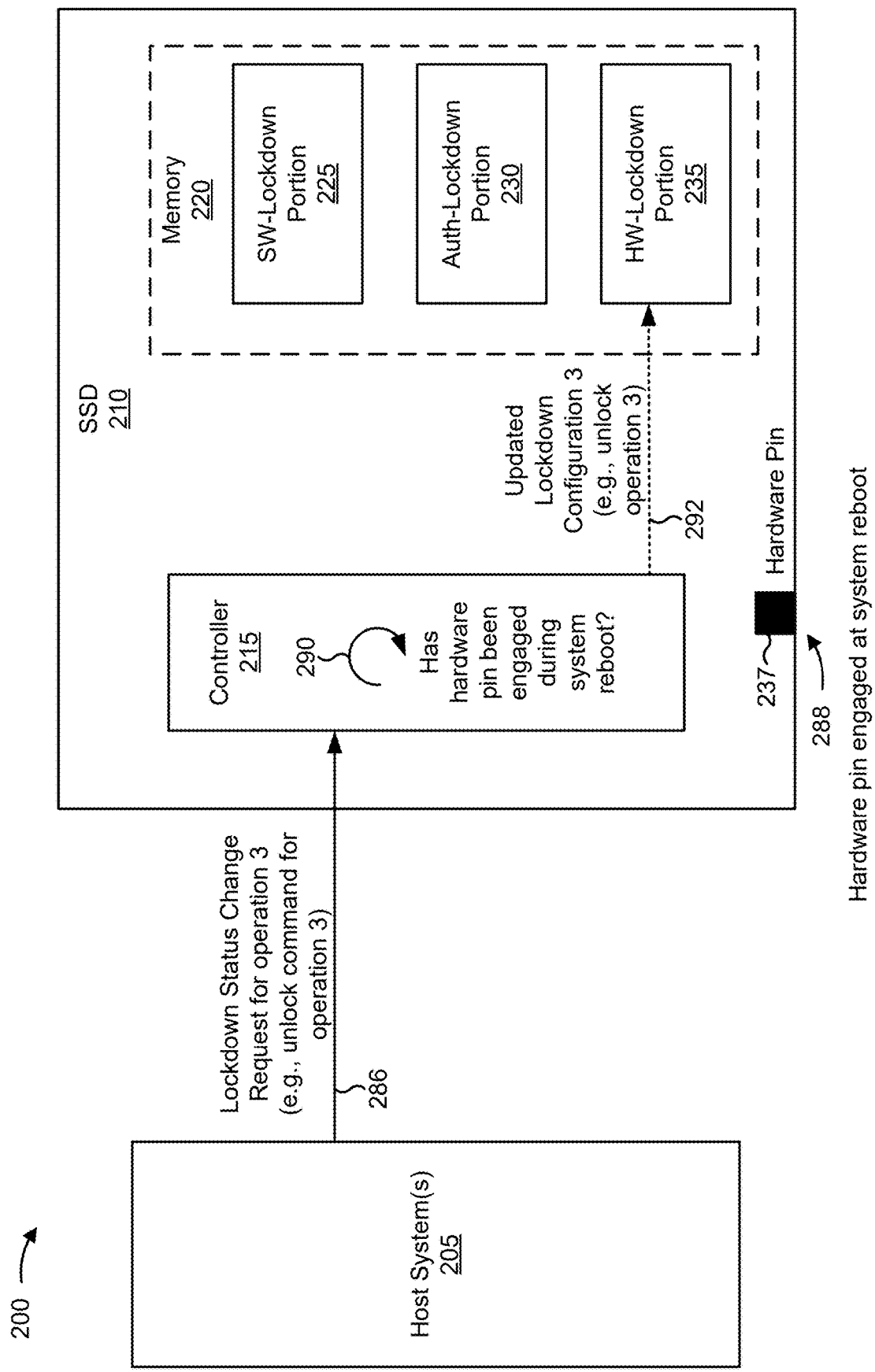

Similarly, as shown in FIG. 2D, and as indicated by reference number 286, a host system 205 may send a lockdown status change request for another operation, such as operation 3. In a similar manner as described above in connection with FIG. 2B, the lockdown status change request may indicate that a certain operation that was previously prohibited and/or locked down is now permitted (e.g., that the operation is to be "unlocked"). In such implementations, if the operation associated with the lockdown status change is one that is associated with the hardware-based lockdown feature, such as operation 3 in example 200, then the lockdown status change request may be associated with engaging a hardware pin (e.g., hardware pin 237), as indicated by reference number 288. Put another way, for operations that have been locked down by the hardware-based lockdown feature, the operation may be unlocked by engaging (e.g., pressing) the hardware pin 237, such as during a system reboot of the SSD 210.

As indicated by reference number 290, the SSD 210 (e.g., the controller 215 of the SSD 210) may determine whether the lockdown status change request is valid, such as by determining whether the hardware pin 237 has been engaged during a system reboot. In implementations in which the lockdown status change request is validated (e.g., in implementations in which the hardware pin 237 has been engaged during a system reboot), an updated lockdown configuration (shown in FIG. 2D as "updated lockdown configuration 3") may be stored in the memory 220, such as in the HW-lockdown portion 235 of the memory 220, as indicated by reference number 292. In some implementations, the updated lockdown configuration may indicate that the corresponding operation has been unlocked, and thus subsequently received commands associated with the operation may be executed by the SSD 210. However, in implementations in which the hardware pin 237 was not engaged during a system reboot, the controller 215 may reject the lockdown status change request, such as by returning a failure status to the host system 205, among other examples.

In some implementations the SSD 210 may be associated with a vehicle (e.g., the SSD 210 may be part of a vehicle's central computer). In such implementations, the vehicle manufacturer may want to restrict (e.g., lockdown) certain operations, such as a firmware download operation, an NVMe format operation and/or a similar command that changes the geometry of the SSD 210, a set/get features for port QoS service setting (sometimes simply referred to herein as a "QoS setting operation" for ease of description), and/or similar operations. Moreover, the vehicle manufacturer may enable the firmware download operation and/or the QoS setting operation to be unlockable at a car service location (e.g., a vehicle dealer's service department) as well as over the air (OTA) so long as a correct password is provided, but, for enhanced security, may only want the NVMe format operation to be unlockable only at the car service location and thus not OTA. In such implementations, the vehicle manufacturer may send a lockdown command that indicates prohibit bits "110" (or simply "010") for command opcodes and/or feature IDs associated with the firmware download operation and the QOS setting operation, and that indicates prohibit bits "001" for a command opcode and/or feature ID associated with the NVMe format operation. Accordingly, if during vehicle operation the SSD 210 receives a firmware download command, an NVMe format command, and/or a QoS setting command, the SSD 210 may identify that the commands are locked down and thus may respond with a failure status, in a similar manner as described above in connection with FIG. 2B. Additionally, or alternatively, a password (e.g., an RPMB password) may be sent OTA only when needed to unlock the firmware download operation and/or the QoS setting operation, in a similar manner as described above in connection with FIG. 2C. Moreover, if necessary to unlock the NVMe format operation, a service technician at a car service location may engage a hardware pin (e.g., hardware pin 237) during a SSD 210 reboot procedure, in a similar manner as described above in connection with FIG. 2D.

In this way, the systems and techniques described herein may enable enhanced security of memory systems, because utilizing authentication-based lockdown features (e.g., auth-lockdown) and/or hardware-based lockdown features (e.g., HW-lockdown) reduces the risk of unauthorized lockdown modification as compared to implementing only software-based lockdown features (e.g., SW-lockdown). Moreover, the systems and techniques described herein enable improved manageability of memory systems, because utilizing an auth-lockdown portion 230 of a memory (e.g., an RPMB) allows authorized users to manage lockdown settings for a memory system (e.g., SSD 210) using a password (e.g., an RPMB password). Additionally, or alternatively, the systems and techniques described herein enable more granular control of memory operations, because they enable the ability to define lockdown contexts with additional levels of security, thereby providing flexibility in securing specific operations (e.g., specific NVMe commands).

FIGS. 2A-2D are provided as an example. Other examples may differ from what is described with regard to FIGS. 2A-2D. The number and arrangement of components shown in FIGS. 2A-2D are provided as an example. In practice, there may be additional components, fewer components, different components, or differently arranged components than those shown in FIGS. 2A-2D.

Figure 3:
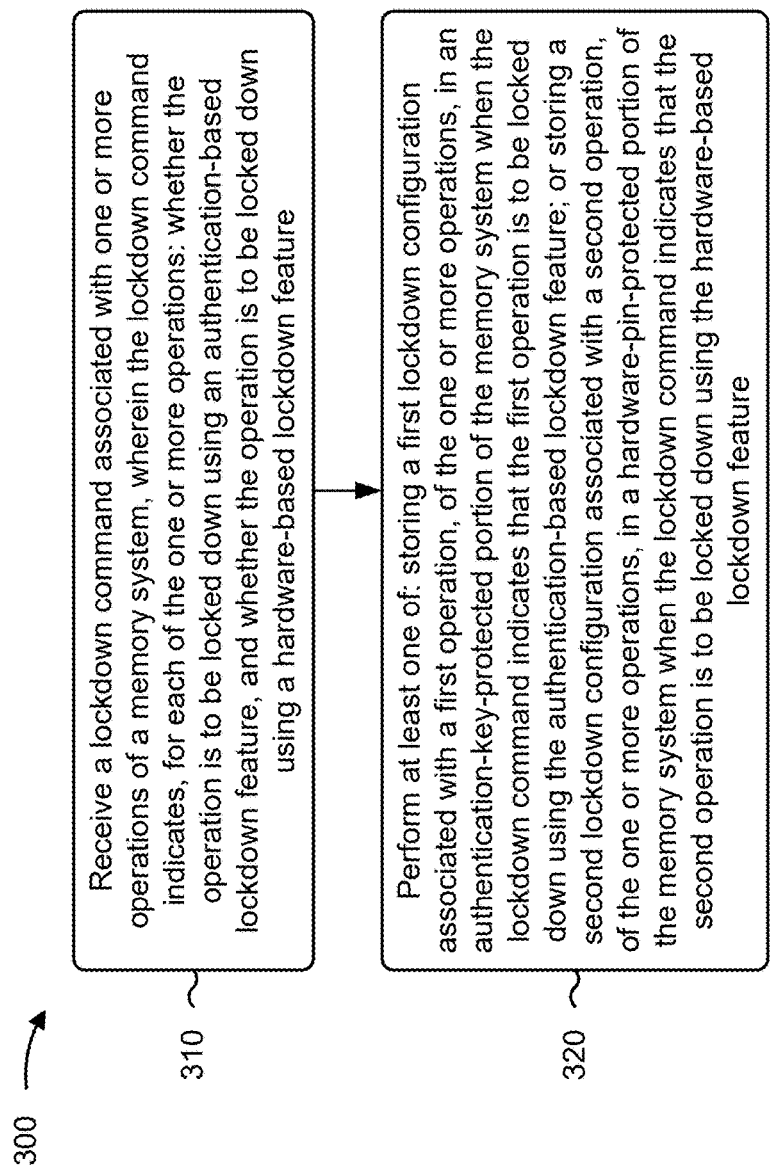
FIG. 3 is a flowchart of an example method associated with authentication-based and hardware-based lockdown features for a memory system.

FIG. 3 is a flowchart of an example method 300 associated with authentication-based and hardware-based lockdown features for a memory system. In some implementations, a memory system controller (e.g., the memory system controller 115 and/or controller 215) may perform or may be configured to perform the method 300. In some implementations, another device or a group of devices separate from or including the memory system controller (e.g., memory system 110, one or more memory devices 120, one or more local controllers 125, and/or SSD 210) may perform or may be configured to perform the method 300. Additionally, or alternatively, one or more components of the memory system controller (e.g., a dedicated lockdown block and/or component of the memory system controller) may perform or may be configured to perform the method 300. Thus, means for performing the method 300 may include the memory system controller and/or one or more components of the memory system controller. Additionally, or alternatively, a non-transitory computer-readable medium may store one or more instructions that, when executed by the memory system controller, cause the memory system controller to perform the method 300.

As shown in FIG. 3, the method 300 may include receiving a lockdown command associated with one or more operations of a memory system, wherein the lockdown command indicates, for each of the one or more operations: whether the operation is to be locked down using an authentication-based lockdown feature, and whether the operation is to be locked down using a hardware-based lockdown feature (block 310). For example, the controller 215 of the SSD 210 may receive the NVMe lockdown command described above in connection with reference number 240, which may include the lockdown information described above in connection with reference number 245. In such implementations, one of the prohibit bits for each command opcode and/or feature ID may indicate whether the corresponding memory operation is associated with an authentication-based lockdown feature, and/or one of the prohibit bits for each command opcode and/or feature ID may indicate whether the corresponding memory operation is associated with a hardware-based lockdown feature, in a similar manner as described above in connection with FIG. 2A.

As further shown in FIG. 3, the method 300 may include performing at least one of: storing a first lockdown configuration associated with a first operation, of the one or more operations, in an authentication-key-protected portion of the memory system when the lockdown command indicates that the first operation is to be locked down using the authentication-based lockdown feature; or storing a second lockdown configuration associated with a second operation, of the one or more operations, in a hardware-pin-protected portion of the memory system when the lockdown command indicates that the second operation is to be locked down using the hardware-based lockdown feature (block 320). For example, in examples in which the lockdown command indicates that operation 2 is to be locked down using the authentication-based lockdown feature and that operation 3 is to be locked down using the hardware-based lockdown feature, the controller 215 of the SSD 210 may store a lockdown configuration associated with operation 2 (e.g., lockdown configuration 2) in the auth-lockdown portion 230 of the memory 220 (e.g., an RPMB and/or a similar authentication-key-protected portion of the memory) and/or the controller 215 may store a lockdown configuration associated with operation 3 (e.g., lockdown configuration 3) in the HW-lockdown portion 235 of the memory 220, as described above in connection with FIG. 2A.

The method 300 may include additional aspects, such as any single aspect or any combination of aspects described below and/or described in connection with one or more other methods or operations described elsewhere herein.

In a first aspect, the memory system is associated with a multi-port memory system, wherein the multi-port memory system is capable of concurrent access by at least one of multiple processors or multiple host systems, and wherein the multi-port memory system is associated with a security feature that enables lockdown, via both the authentication-based lockdown feature and the hardware-based lockdown feature, of at least one of the one or more operations or one or more data regions of the multi-port memory system. For example, the memory system may correspond to the SSD 210, which, in some implementations, may be a multi-port SSD used in automotive applications and/or which may be capable of locking down commands (e.g., NVMe commands) via both the authentication-based lockdown feature and the hardware-based lockdown feature as described above, among other examples. In such implementations, a first port, of the multi-port SSD may be associated with an IVI system of a vehicle, and/or a second port, of the multi-port SSD, may be associated with ADAS of the vehicle, among other examples.

In a second aspect, alone or in combination with the first aspect, the authentication-based lockdown feature is associated with an RPMB. For example, the authentication-based lockdown may utilize an RPMB to store lockdown configurations associated with certain operations and/or the authentication-based lockdown feature may require an RPMB password to unlock certain operations, as described above in connection with FIGS. 2A-2C.

In a third aspect, alone or in combination with one or more of the first and second aspects, the authentication-based lockdown feature and the hardware-based lockdown feature are associated with lockdown configurations that are persistent across a power cycle of the memory system. For example, as described above in connection with the auth-lockdown portion 230 of the memory 220 and the HW-lockdown portion 235 of the memory 220, the lockdown configurations stored in connection with the authentication-based lockdown feature and the hardware-based lockdown feature may persist across power cycles of the SSD 210.

In a fourth aspect, alone or in combination with one or more of the first through third aspects, the method 300 includes receiving, by the memory system controller, a request to change a lockdown status associated with at least one operation that is associated with the authentication-based lockdown feature, receiving, by the memory system controller, a password associated with the authentication-based lockdown feature, and validating, by the memory system controller, the request to change the lockdown status associated with the at least one operation based on the password. For example, and as described above in connection with reference numbers 280, 282, and 284 of FIG. 2C, operations associated with the authentication-based lockdown feature may be unlocked using a password, such as an RPMB password or a similar authentication key.

In a fifth aspect, alone or in combination with one or more of the first through fourth aspects, the hardware-based lockdown feature is associated with a hardware pin associated with the memory system. For example, the hardware-based lockdown feature may be associated with the hardware pin 237 described above in connection with the SSD 210.

In a sixth aspect, alone or in combination with one or more of the first through fifth aspects, the method 300 includes receiving, by the memory system controller, a request to change a lockdown status associated with at least one operation that is associated with the hardware-based lockdown feature, determining, by the memory system controller, that a hardware pin associated with the hardware-based lockdown feature has been engaged during a memory system reboot, and validating, by the memory system controller, the request to change the lockdown status associated with the at least one operation based on determining that the hardware pin associated with the hardware-based lockdown feature has been engaged during the memory system reboot. For example, and as described above in connection with reference numbers 286, 288, 290, and 292 of FIG. 2D, operations associated with the hardware-based lockdown feature may be unlocked by engaging a hardware pin, such as by engaging the hardware pin 237 during a system reboot of the SSD 210.

In a seventh aspect, alone or in combination with one or more of the first through sixth aspects, for each of the one or more operations, the lockdown command jointly encodes whether the operation is to be locked down using a software-based lockdown feature, whether the operation is to be locked down using the authentication-based lockdown feature, and whether the operation is to be locked down using the hardware-based lockdown feature. For example, the lockdown command may include, for each command opcode and/or feature ID, a three-bit bit string that jointly encodes whether that command opcode and/or feature ID is to be locked down using the software-based lockdown feature (e.g., an NVMe lockdown feature), the authentication-based lockdown feature, and/or the hardware-based lockdown feature, as described above in connection with reference number 245 of FIG. 2A.

In an eighth aspect, alone or in combination with one or more of the first through seventh aspects, the method 300 includes receiving, by the memory system controller, a command associated with an operation, of the one or more operations, determining, by the memory system controller, a lockdown status associated with the operation, and performing, by the memory system controller, one of executing the command when the lockdown status indicates that the operation is not prohibited, or refraining from executing the command when the lockdown status indicates that the operation is prohibited. For example, the controller 215 of the SSD 210 may receive a command, such as the command described above in connection with reference number 265 of FIG. 2B, and may either execute the command or refrain from executing the command depending on whether the command is locked down according to the authentication-based lockdown feature and/or the hardware-based lockdown feature, as described above in connection with reference numbers 270 and 275 of FIG. 2B.

Although FIG. 3 shows example blocks of a method 300, in some implementations, the method 300 may include additional blocks, fewer blocks, different blocks, or differently arranged blocks than those depicted in FIG. 3. Additionally, or alternatively, two or more of the blocks of the method 300 may be performed in parallel. The method 300 is an example of one method that may be performed by one or more devices described herein. These one or more devices may perform or may be configured to perform one or more other methods based on operations described herein.

In some implementations, a memory system includes one or more components configured to: receive, from a host system, a lockdown command associated with one or more operations of the memory system, wherein the lockdown command indicates, for each of the one or more operations: whether the operation is to be locked down using an authentication-based lockdown feature, and whether the operation is to be locked down using a hardware-based lockdown feature; and perform at least one of: store a first lockdown configuration associated with a first operation, of the one or more operations, in an authentication-key-protected portion of the memory system when the lockdown command indicates that the first operation is to be locked down using the authentication-based lockdown feature; or store a second lockdown configuration associated with a second operation, of the one or more operations, in a hardware-pin-protected portion of the memory system when the lockdown command indicates that the second operation is to be locked down using the hardware-based lockdown feature.

In some implementations, a method includes receiving, by a memory system controller from a host system, a lockdown command associated with one or more operations of a memory system, wherein the lockdown command indicates, for each of the one or more operations: whether the operation is to be locked down using an authentication-based lockdown feature, and whether the operation is to be locked down using a hardware-based lockdown feature; and performing, by the memory system controller, at least one of: storing a first lockdown configuration associated with a first operation, of the one or more operations, in an authentication-key-protected portion of the memory system when the lockdown command indicates that the first operation is to be locked down using the authentication-based lockdown feature; or storing a second lockdown configuration associated with a second operation, of the one or more operations, in a hardware-pin-protected portion of the memory system when the lockdown command indicates that the second operation is to be locked down using the hardware-based lockdown feature.

In some implementations, a multi-port solid state drive (SSD) includes one or more components configured to: receive, from a host system, a non-volatile memory express (NVMe) lockdown command that indicates one or more arguments, wherein each argument, of the one or more arguments, is associated with a memory operation, of one or more memory operations associated with the multi-port SSD, and wherein each argument, of the one or more arguments, indicates: whether the memory operation for the argument is to be locked down using an authentication-based lockdown feature, and whether the memory operation for the argument is to be locked down using a hardware-based lockdown feature; and perform at least one of: store a first lockdown configuration associated with a first memory operation, of the one or more memory operations, in an authentication-key-protected portion of the multi-port SSD when the NVMe lockdown command indicates that the first memory operation is to be locked down using the authentication-based lockdown feature; or store a second lockdown configuration associated with a second memory operation, of the one or more memory operations, in a hardware-pin-protected portion of the multi-port SSD when the NVMe lockdown command indicates that the second memory operation is to be locked down using the hardware-based lockdown feature.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory system, comprising:
   one or more components configured to:
      receive, from a host system, a lockdown command associated with one or more operations of the memory system, wherein the lockdown command indicates, for each of the one or more operations:
         whether the operation is to be locked down using an authentication-based lockdown feature, and
         whether the operation is to be locked down using a hardware-based lockdown feature; and
      perform at least one of:
         store a first lockdown configuration associated with a first operation, of the one or more operations, in an authentication-key-protected portion of the memory system when the lockdown command indicates that the first operation is to be locked down using the authentication-based lockdown feature; or
         store a second lockdown configuration associated with a second operation, of the one or more operations, in a hardware-pin-protected portion of the memory system when the lockdown command indicates that the second operation is to be locked down using the hardware-based lockdown feature.

2. The memory system of claim 1, wherein the memory system is associated with a multi-port memory system,
   wherein the multi-port memory system is capable of concurrent access by at least one of multiple processors or multiple host systems, and
   wherein the multi-port memory system is associated with a security feature that enables lockdown, via both the authentication-based lockdown feature and the hardware-based lockdown feature, of at least one of the one or more operations or one or more data regions of the multi-port memory system.

3. The memory system of claim 1, wherein the authentication-based lockdown feature is associated with a replay protected memory block.

4. The memory system of claim 1, wherein the authentication-based lockdown feature and the hardware-based lockdown feature are associated with lockdown configurations that are persistent across a power cycle of the memory system.

5. The memory system of claim 1, wherein the one or more components are further configured to:
receive a request to change a lockdown status associated with at least one operation that is associated with the authentication-based lockdown feature;
receive a password associated with the authentication-based lockdown feature; and
validate the request to change the lockdown status associated with the at least one operation based on the password.

6. The memory system of claim 1, wherein the hardware-based lockdown feature is associated with a hardware pin associated with the memory system.

7. The memory system of claim 1, wherein the one or more components are further configured to:
receive a request to change a lockdown status associated with at least one operation that is associated with the hardware-based lockdown feature;
determine that a hardware pin associated with the hardware-based lockdown feature has been engaged during a memory system reboot; and
validate the request to change the lockdown status associated with the at least one operation based on determining that the hardware pin associated with the hardware-based lockdown feature has been engaged during the memory system reboot.

8. The memory system of claim 1, wherein, for each of the one or more operations, the lockdown command jointly encodes whether the operation is to be locked down using a software-based lockdown feature, whether the operation is to be locked down using the authentication-based lockdown feature, and whether the operation is to be locked down using the hardware-based lockdown feature.

9. The memory system of claim 1, wherein the one or more components are further configured to:
receive a command associated with an operation, of the one or more operations;
determine a lockdown status associated with the operation; and
perform one of:
execute the command when the lockdown status indicates that the operation is not prohibited; or
refrain from executing the command when the lockdown status indicates that the operation is prohibited.

10. A method, comprising:
receiving, by a memory system controller from a host system, a lockdown command associated with one or more operations of a memory system, wherein the lockdown command indicates, for each of the one or more operations:
whether the operation is to be locked down using an authentication-based lockdown feature, and
whether the operation is to be locked down using a hardware-based lockdown feature; and
performing, by the memory system controller, at least one of:
storing a first lockdown configuration associated with a first operation, of the one or more operations, in an authentication-key-protected portion of the memory system when the lockdown command indicates that the first operation is to be locked down using the authentication-based lockdown feature; or
storing a second lockdown configuration associated with a second operation, of the one or more operations, in a hardware-pin-protected portion of the memory system when the lockdown command indicates that the second operation is to be locked down using the hardware-based lockdown feature.

11. The method of claim 10, wherein the memory system is associated with a multi-port memory system,
wherein the multi-port memory system is capable of concurrent access by at least one of multiple processors or multiple host systems, and
wherein the multi-port memory system is associated with a security feature that enables lockdown, via both the authentication-based lockdown feature and the hardware-based lockdown feature, of at least one of the one or more operations or one or more data regions of the multi-port memory system.

12. The method of claim 10, wherein the authentication-based lockdown feature is associated with a replay protected memory block.

13. The method of claim 10, wherein the authentication-based lockdown feature and the hardware-based lockdown feature are associated with lockdown configurations that are persistent across a power cycle of the memory system.

14. The method of claim 10, further comprising:
receiving, by the memory system controller, a request to change a lockdown status associated with at least one operation that is associated with the authentication-based lockdown feature;
receiving, by the memory system controller, a password associated with the authentication-based lockdown feature; and
validating, by the memory system controller, the request to change the lockdown status associated with the at least one operation based on the password.

15. The method of claim 10, wherein the hardware-based lockdown feature is associated with a hardware pin associated with the memory system.

16. The method of claim 10, further comprising:
receiving, by the memory system controller, a request to change a lockdown status associated with at least one operation that is associated with the hardware-based lockdown feature;
determining, by the memory system controller, that a hardware pin associated with the hardware-based lockdown feature has been engaged during a memory system reboot; and
validating, by the memory system controller, the request to change the lockdown status associated with the at least one operation based on determining that the hardware pin associated with the hardware-based lockdown feature has been engaged during the memory system reboot.

17. The method of claim 10, wherein, for each of the one or more operations, the lockdown command jointly encodes whether the operation is to be locked down using a software-based lockdown feature, whether the operation is to be locked down using the authentication-based lockdown feature, and whether the operation is to be locked down using the hardware-based lockdown feature.

18. The method of claim 10, further comprising:
receiving, by the memory system controller, a command associated with an operation, of the one or more operations;
determining, by the memory system controller, a lockdown status associated with the operation; and
performing, by the memory system controller, one of:
executing the command when the lockdown status indicates that the operation is not prohibited; or
refraining from executing the command when the lockdown status indicates that the operation is prohibited.

19. A multi-port solid state drive (SSD), comprising:
one or more components configured to:
   receive, from a host system, a non-volatile memory express (NVMe) lockdown command that indicates one or more arguments,
     wherein each argument, of the one or more arguments, is associated with a memory operation, of one or more memory operations associated with the multi-port SSD, and
     wherein each argument, of the one or more arguments, indicates:
       whether the memory operation for the argument is to be locked down using an authentication-based lockdown feature, and
       whether the memory operation for the argument is to be locked down using a hardware-based lockdown feature; and
   perform at least one of:
     store a first lockdown configuration associated with a first memory operation, of the one or more memory operations, in an authentication-key-protected portion of the multi-port SSD when the NVMe lockdown command indicates that the first memory operation is to be locked down using the authentication-based lockdown feature; or
     store a second lockdown configuration associated with a second memory operation, of the one or more memory operations, in a hardware-pin-protected portion of the multi-port SSD when the NVMe lockdown command indicates that the second memory operation is to be locked down using the hardware-based lockdown feature.

20. The multi-port SSD of claim 19, wherein, for each of the one or more memory operations, the NVMe lockdown command jointly encodes whether the memory operation is to be locked down using a software-based lockdown feature, whether the memory operation is to be locked down using the authentication-based lockdown feature, and whether the memory operation is to be locked down using the hardware-based lockdown feature.

\* \* \* \* \*